M. E. CHURCH.
EDUCATIONAL GAME DEVICE.
APPLICATION FILED APR. 4, 1908.

972,335.

Patented Oct. 11, 1910.

Witnesses:
Horace H. Crossman
Robert H. Kammler

Inventor:
May E. Church.
by Emery & Booth
Attys.

UNITED STATES PATENT OFFICE.

MAY E. CHURCH, OF BOSTON, MASSACHUSETTS.

EDUCATIONAL GAME DEVICE.

972,335.   Specification of Letters Patent.   Patented Oct. 11, 1910.

Application filed April 4, 1908.   Serial No. 425,153.

*To all whom it may concern:*

Be it known that I, MAY E. CHURCH, a citizen of the United States, residing at Boston, in the county of Suffolk, Commonwealth of Massachusetts, have invented an Improvement in Educational Game Devices, of which the following description, in connection with the accompanying drawings, is a specification, like letters on the drawings representing like parts.

This invention relates to an educational game device; and pertains more particularly to game devices to be employed in teaching music.

Such game devices as are contemplated by the invention may have various purposes in connection with the teaching or rhythm, relations of tones, intervals, etc., melodic sequence of tones, relations of voices, harmonic progression, relations of parts, etc.

It is an object of the invention among others to present to the pupil in the form of a readily understood and simple game device various features of musical composition with which he may become familiar and in which he may become practiced by the playing of an interesting game according to any practicable rules of procedure which may be devised.

The general character of the invention may be best understood by reference to a specific so-called " rhythm game " which will be described herein merely for purposes of illustration and explanation.

The specific game device employed in this game comprises a plurality of cards such as are shown in the accompanying drawings, in which—

Figures 1, 2, 3, 4, 5 and 6 show respectively individual cards having thereon differently grouped indications of rhythm.

In imparting to a pupil a proper comprehension and appreciation of music and musical composition it is necessary to secure upon the part of the pupil, *inter alia*, a strong clear sense of rhythmic pulsation, such as to awaken in the pupil a quick perception of rhythm and musical time indicated by any group or series of musical symbols. This end is ordinarily accomplished by counting, each note being given a time value of a fraction or one or more counts. This method, however, is so largely mechanical that, when employed, it encourages reliance upon a mere arbitrary and mechanical counting, instead of upon the general rhythmic quality characteristically pertaining to any particular composition.

The illustrative game devices about to be described are particularly adapted for teaching rhythm independently of any mechanical or arbitrary method of counting.

Figure 1:
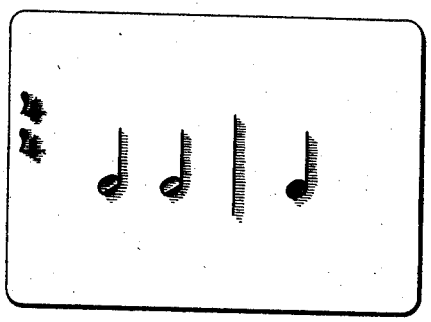
Figure 2:
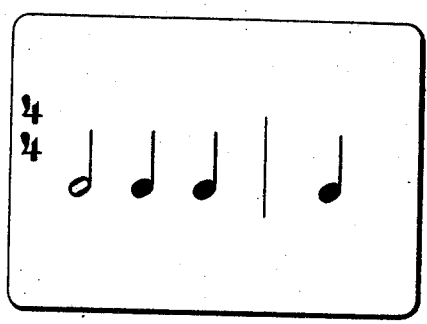
Figure 3:
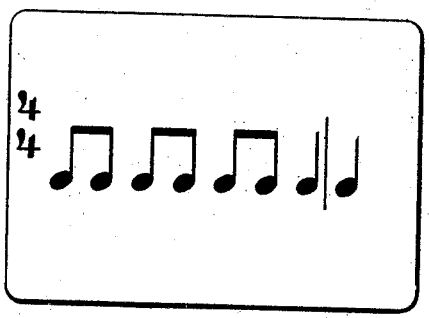
Figure 4:
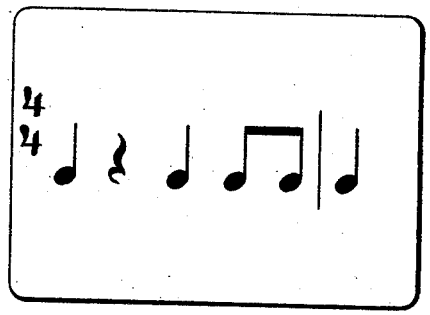
Figure 5:
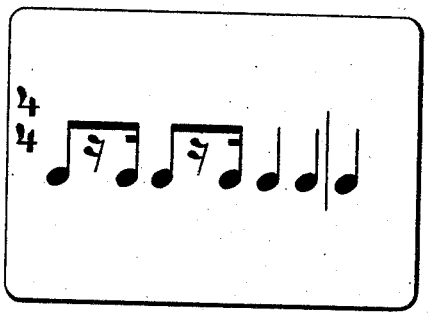
Figure 6:
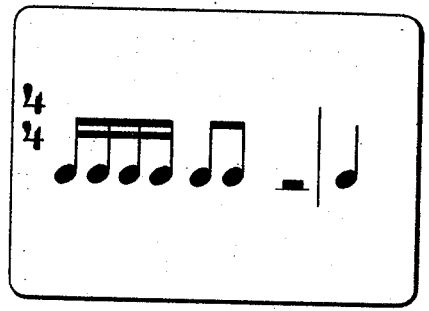

Referring now to Fig. 1, there is shown an exemplary card having thereon two half notes; Fig. 2 shows a half, and two quarter notes; Fig. 3 shows six eighth notes and a quarter note; Fig. 4 shows a quarter note, a quarter rest and a quarter and two eighth notes; Fig. 5 shows an eighth note, a sixteenth rest and a sixteenth note, and a repetition of the same, together with two quarter notes; and, Fig. 6 shows four sixteenth and two eighth notes, and a half rest.

Preferably upon each of the cards, as shown, there is indicated a meter mark, of which the lower figure indicates the unit of pulse length and the upper figure serves to distinguish primary and secondary accents. Also it is preferred that each card (for the purposes of the illustrative rhythm game) comprises one complete measure and a note, as a quarter note, of the next succeeding measure.

The complete rhythm device may comprise any suitable number of cards; and the different cards may exhibit as many variations and combinations of note and rest values as desired.

Preferably in each pack, each card is duplicated to suit the purposes of the specific manner of using the game device hereinafter described for illustration.

To start the game in the preferred use of the rhythm game device, it is desirable to adopt a suitable pulse length, which may be indicated or imparted to the players by a metronome or by clapping the hands for a few moments, it being the intent that the pupil shall carry in his mind the perception of the pulse without other assistance than that of his memory.

The game device may be used by dealing to each pupil of the class a number of cards, as four or five. Each pupil examines his hand to ascertain whether he holds duplicates. If he finds a pair of duplicates he removes them from his hand and places them on the table as a trick or " book." When duplicates have been thus discarded the pupil at the left of the dealer selects some card from his hand which he desires to duplicate so as to procure another trick; he then interprets the rhythm indicated upon the selected card and communicates his interpretation to the other players by appropriately clapping his hands or rapping upon the table or in any other suitable manner. Thus having indicated the card which he desires, he chooses one of the other players and asks him for the card, which, if the player have it, is delivered up to him, matched with the previously selected card, and placed upon the table as a trick. In this manner, taking e. g. the card of Fig. 1, the player would clap his hands thrice in proper relation to indicate the two half notes and the quarter note at the beginning of the next measure, the latter serving to show that his description of the card which he desires has been completed. During this play the immediate player, as well as the others, must bear in mind the basic pulse selected at the beginning of the game; and all of the players must recognize and appreciate the particular rhythm or series of note values described by the clapping or rapping; and must also be able to identify the same with appropriate indications on the game devices.

If the immediate player obtains from the other chosen player the card which he requested, he may have other turns repeated. When he fails he may draw a card from the undealt pack; and if the desired card be drawn he may take still other turns until he fails to secure a match. Thereupon the play may pass in any desired sequence to other players, who, in like manner, select cards to be matched, and express the rhythm represented thereon by clapping, rapping or otherwise in such a manner that the rhythm itself is interpreted and reproduced to be recognized by the other players.

When the play is ended, as for example, upon the pack being exhausted, the player who has secured the greatest number of tricks or books by matching his cards may be designated the winner.

In interpreting and reproducing rests, the same may be indicated by an upward motion of the hand which may remain raised during the duration of the rest.

In such cases as that just suggested the rhythm game device has great utility. For instance, the players have not only to interpret rhythm and reproduce it, preferably under the guidance of a teacher, but they have also to recognize a particular rhythm and to identify it with a particular series of symbols. Such a game is of great educational value, since it tends to develop an intuitive appreciation and perception of rhythm.

The invention contemplates more than mere rhythm game devices, since it may be utilized in various ways to teach music; for example, the cards or other playing units may have represented or indicated thereon different constructional parts of a musical composition, as sections, double-sections, phrases, double-phrases, periods, binaries, ternaries, sonatina forms, etc., whereby the principles of musical construction may be taught. This may be done according to any suitable rules of procedure, as by having the cards supplied each with only a fraction of a constructional part, the lacking fraction being recognized by the player and called for in any practicable manner or selected from a hand placed face up on the table.

Such game devices as are contemplated by the invention may be constructed in any practicable manner, as by having blocks or other articles, instead of cards, or having the characters formed or mounted or exposed thereon in any suitable manner. For example, as illustrated in Fig. 1, the symbols consist of projections on the card, such that they can be readily read or can be felt, for instance, by blind pupils. All such changes and modifications and many others which will appear to those skilled in the art are included within the proper scope of this invention as it is defined in the subjoined claims, the invention being of course not limited to the specific embodiments described nor to the specific mode of use explained for purposes of illustration.

Claims:

1. An educational game device comprising a pack of playing cards comprising duplicate sets of cards each card having represented thereon a series of music symbols aggregating a measure in time value, and having thereon also a note of the next succeeding measure, and also a meter mark.

2. An educational game device comprising a pack of playing cards comprising duplicate sets of cards each card having represented thereon a plurality of music symbols indicating rhythm and having also a meter mark to indicate the basic unit of pulse length.

3. An educational game device comprising a plurality of playing units adapted to be paired off one with another in the use of the game device, each card having indicated thereon music symbols indicating a unit of pulse length and rhythm referable thereto.

4. A game device comprising a plurality of playing units adapted to be separately played in desired sequence, each unit having thereon an indication representing a complete feature of a musical composition.

5. An educational game device comprising a plurality of playing units adapted to be paired off one with another in the use of the game device, each card having indicated thereon music symbols comprising a perfect musical measure.

6. An educational game device comprising a plurality of playing units each having represented thereon a series of symbols representing, and aggregating in time value, a complete measure, and each having thereon a meter mark to indicate the basic unit of pulse length whereby each card presents a complete rhythmic unit.

In testimony whereof, I have signed my name to this specification, in the presence of two subscribing witnesses.

MAY E. CHURCH.

Witnesses:
 FREDERIC GILBERT BAUER,
 EVERETT S. EMERY.